United States Patent Office 3,780,070
Patented Dec. 18, 1973

3,780,070
4-AZIDO-17α-ALKINYL-4-GONEN-17β-OL-3-ONES
AND METHOD FOR THEIR PREPARATION
Elliot L. Shapiro, Cedar Grove, N.J., assignor to
Schering Corporation, Bloomfield, N.J.
No Drawing. Filed Sept. 21, 1972, Ser. No. 291,113
Int. Cl. C07c 173/10
U.S. Cl. 260—349                                    10 Claims

ABSTRACT OF THE DISCLOSURE

4 - azido - 17α - alkinyl - 4 - gonene - 17β - ol - 3-ones having contraceptive activity are prepared by treating the corresponding 4,5-oxido-4,5-dihydro derivative with an alkali metal azide in slightly acidic aqueous alkanol. A preferred compound is 4-azido - 17α - ethinyl-4-estren-17β-ol-3-one.

FIELD OF THE INVENTION

This invention relates to novel compositions of matter and to processes for their manufacture.

More specifically, this invention relates to steroids of the gonane series which may be classified as 4-azido-17α-alkinyl - 4 - gonen - 17β - ol - 3 - ones, to methods for their manufacture, and to intermediates produced thereby.

SUMMARY OF INVENTION

The composition-of-matter aspect of this invention resides in the concept of a chemical compound having contraceptive activity which has a molecular structure comprising a 4-gonen-17β-ol-3-one nucleus with an azido group at C–4, a hydrogen, lower alkyl, chlorine or fluorine at C–11, and an α-ethinyl group or derivative thereof at C–17. A preferred compound is 4-azido-17α-ethinyl-4-estren-17β-ol-3-one.

The process aspect of this invention resides in the concept of treating a 4,5-oxido - 17α - alkinylgonan-17β-ol-3-one in slightly acidic aqueous alkanol with an alkali metal azide whereby is produced a 4-azido - 17α - alkinyl-4-gonen - 17β - ol-3-one of this invention having antifertility activity. A preferred species of this process is that wherein the alkali metal azide is sodium azide.

GENERAL DESCRIPTION OF THE INVENTION

Included among the composition-of-matter of this invention are 4-azido - 17α - alkinyl - 4 - gonen-17β-ol-3-ones having the following structural Formula I:

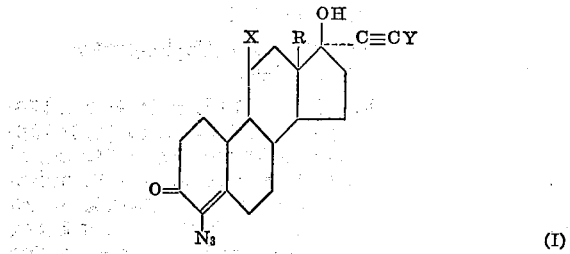

wherein R is lower alkyl, X is a member selected from the group consisting of hydrogen, lower alkyl, chlorine and fluorine, and Y is a member selected from the group consisting of hydrogen, methyl, bromine, and trifluoromethyl.

The lower alkyl groups contemplated for R and X are those having up to three carbon atoms including n-propyl, ethyl and, preferably, methyl.

Those compounds of my invention wherein R is other than methyl, e.g. 4-azido - 13β - ethyl - 17α - ethinyl-4-gonene - 17β - ol - 3 - one, exist in isomeric forms (i.e. d and l) or as racemic mixtures (i.e. dl). In general, unless an isomeric form is specifically designated, a compound name inherently includes both isomeric forms.

Included among the compounds of my invention are:

4-azido-17α-ethinyl-4-estren-17β-ol-3-one (preferred compound of my invention),
4-azido-13β-ethyl-17α-ethinyl-4-gonen-17β-ol-3-one,
4-azido-11β-chloro-17α-ethinyl-estren-17β-ol-3-one,
4-azido-17α-propinyl-4-estren-17β-ol-3-one,
4-azido-13β-ethyl-17α-propinyl-4-gonen-17β-ol-3-one,
4-azido-17α-(2'-bromoethinyl)-4-estren-17β-ol-3-one,
4-azido-11β-fluoro-17α-ethinyl-4-estren-17β-ol-3-one,
4-azido-11β-fluoro-17α-(2'-trifluoromethylethinyl)-4-estren-17β-ol-3-one,
4-azido-17α-(2'-trifluoromethylethinyl)-4-estren-17β-ol-3-one, and
4-azido-11β-methyl-17α-ethinyl-4-estren-17β-ol-3-one.

The physical embodiments of the 4-azido-17α-alkinyl-4-gonenes of Formula I are characterized by being crystalline solids, usually off-white to white in color, and which are insoluble in water and soluble in most organic solvents.

The 4-azido-17α-alkinyl-4-gonenes of Formula I are physiologically active compounds possessing contraceptive activity as demonstrated by tests in rats. Thus, 4-azido - 17α - ethinyl - 4 - estren-17β-ol-3-one demonstrates contraceptive activity when administered orally in the rat in dosages of about from 1 to 5 mg./kg. when tested in the post-implantation and mating tests according to known procedures as described in Proceedings of the Second International Congress on Hormonal Steroids, Excerpta Medica International Congress Series No. 132, p. 889 (1966). Additionally, my compounds advantageously possess little or no progestational activity marking them of particular value when used as contraceptive agents because they will be less likely to affect the menstrual cycle than progestational agents.

The physiologically active compounds of this invention, e.g. 4-azido-17α-ethinyl-4-estren-17β-ol-3-one, may be administered orally or parenterally by incorporating a therapeutic dosage in conventional pharmaceutical forms such as tablets, capsules, elixers, suspensions, solutions and the like. They can be administered in admixture with pharmaceutical excipients which are edible and chemically inert to the aforementioned 4-azido-17α-alkinyl-4-gonenes, typical excipients being cornstarch, lactose, sucrose, gum arabic usually in admixture with an additive such as magnesium stearate, talc, and the like. Other compositions may be used such as fine powders or granules of 4-azido-17α-ethinyl-4-estren-17β-ol-3-one or derivatives thereof, which compositions may contain diluents and dispersing and surface active agents, and may be presented in a syrup, or in non-aqueous suspensions, in aqueous suspensions, or in an oil.

PROCESS ASPECT OF THE INVENTION

The 4-azido-17α-alkinyl-4-gonenes of Formula I are prepared from the corresponding 4,5-oxido-17α-alkinylgonanes by treatment thereof with an alkali metal azide in a non-reactive organic solvent, preferably a solvent, mixture in which water is present (e.g. aqueous methanol, aqueous methanol/dioxane, aqueous dioxane, aqueous tetrahydrofuran, and the like) under mild conditions in neutral or slightly basic or slightly acidic media whereby the epoxy function is split and there is introduced in the molecule a 4-azido-5-hydroxy system to form a novel intermediate in situ which is immediately dehydrated to form a 4-azido-4-gonene of Formula I.

In this process, the alkali metal reagent of choice is sodium azide, although there may be used other alkali metal azides such as potassium azide, lithium azide, or quaternary ammonium azides such as tetrabutylammonium azide.

The solvents used in the epoxide splitting and dehydrating step may be any non-reactive, organic solvent in which the starting compound and azide reagent are soluble, and which will not react with an alkali metal azide or the steroid substrate under the conditions of the reaction so as to cause transformations resulting in competing side reactions. Solvents contemplated for my process include lower alkanols (e.g. methanol and ethanol), glycols (e.g. ethyleneglycol and the dimethyl ether thereof), oxygen containing heterocyclics (e.g. dioxane and tetrahydrofuran), and N,N-dialkyl amides (e.g. dimethylformamide). As stated hereinabove, water may be present in the solvent (aqueous methanol being conveniently used in my process).

My process whereby a 4,5-oxido-17α-alkinylgonane is converted to a 4-azido-17α-alkinyl-4-gonene is usually carried out at temperatures ranging from about 20° C. to about 80° C. (preferably room temperature) with the reaction mixture being stirred for about 30 to 60 hours (usually about 40–50 hours) or until the reaction is complete as evidenced by thin layer chromatography.

Generally, when preparing a 4-azido-17α-alkinyl-4-gonene of Formula I (e.g. 4-azido-17α-ethinyl-5-estren-17β-ol-3-one) by my process, the alkali metal reagent (e.g. sodium azide) is added to a solution or suspension of a corresponding 4,5-oxido-derivative (e.g. 4,5-oxido-17α-ethinylestren-17β-ol-3-one), the quantities of reagent from one to thirty moles of alkali metal azide per mole of steroid, preferably eight to twenty moles of alkali metal azide per mole of steroid. The reaction is preferably carried out at room temperature until the conversion of the 4,5-oxido-gonane to the 4-azido-4-gonene is complete as evidenced by thin layer chromatographic analysis. The resulting 4-azido-17α-alkinyl-4-gonene (e.g. 4-azido-17α-ethinyl-4-estren-17β-ol-3-one) is isolated utilizing known techniques. Usually, the reaction mixture is poured into a large volume of water (optionally saturated with a salt such as sodium chloride) and the resulting insoluble fraction collected by filtration, then air dried. Further purification may be effected by recrystallization or chromatography.

I have found my process is advantageously carried out in the presence of an acid. Thus, 4,5-oxido-17α-ethinyl-4-estren-17β-ol-3-one in aqueous methanol to which a few milliliters of acetic acid are added yields 4-azido-17α-ethinyl-4-estren-17β-ol-3-one in good yield.

The 4,5-oxidogonane starting compounds for my process are either known or are conveniently prepared according to known procedures from the corresponding 4,5-unsubstituted-4-gonene by reaction with alkaline hydrogen peroxide in aqueous methanol. The 4,5-oxidogonanes are usually formed as a mixture of 4α,5α-oxido and 4β,5β-oxido derivatives, with the beta form predominating. Either isomeric form or the isomeric mixture thereof may be used in the process of this invention. In turn, the requisite 4,5-unsubstituted-4-gonene precursors of the 4,5-oxidogonane starting compounds are either known or are prepared from known compounds via techniques and transformations known in the art. For example, the starting compound precursor 11β-methyl-17α-ethinyl-4-estren-17β-ol, is prepared from 11β-methyl-19-nor-testosterone by acetylating the 17β-hydroxy group with acetic anhydride in pyridine followed by 3-enol-ether formation of the resulting 17β-acetate derivative with an alkyl orthoformate according to known procedures followed by basic saponification of the 17-acetate ester in the thereby formed 3-enol-ether of 11β-methyl-19-nortestosterone 17-acetate. Oxidation of the free 17β-hydroxyl function with chormic acid in pyridine yields the corresponding 17-keto compound, i.e. the 3-enol ether of 11β-methyl-4-estren-3-one, which, upon treatment with sodium acetylide followed by regeneration of the 3-keto-4-dehydro system yields 11β-methyl-17α-ethinyl-4-estren-17β-ol-3-one. Treatment of the foregoing with alkaline hydrogen peroxides yields 4,5-oxido-11β-methyl-estran-17β-ol-3-one, a starting compound of the process of this invention.

The 4,5-oxidogonane starting compounds of my invention preferably possess all those substituents desired in the therapeutically active final product of Formula I. Thus, when preparing derivatives of Formula I such as 4-azido-11β-chloro-4-estren-17β-ol-3-one (compound of Formula I wherein X is chloro), 4-azido-17α-(2'-trifluoromethylethinyl)-4-estren-17β-ol-3-one (compound of Formula I wherein Y is trifluoromethyl), or 4-azido-13β-ethyl-17α-ethinyl-4-gonene-17β-ol-3-one (compound of Formula I wherein R is ethyl), the starting 4,5-oxidogonane compounds are, preferably, 4,5-oxido-11β-chloro-17α-ethinyl-estren-17β-ol-3-one; 4,5-oxido-17α-trifluoromethylestrane-17β-ol-3-one and 4,5 - oxido-13β-ethyl-17α-ethinylgonane-17β-ol-3-one, respectively.

The following examples are given by way of illustration and are not to be construed as limiting this invention, the scope of which is indicated in the appended claims.

EXAMPLE 1

4-azido-17α-ethinyl-4-estren-17β-ol-3-one (A) 4,5 - oxido-17α-ethinylestran-17β-ol-3-one.—To a solution of 11.92 g. of 17α-ethinyl-4-estren-17β-ol-3-one in 600 ml. of methanol maintained at 5° C., add 60 ml. of 30% hydrogen peroxide and 4.0 ml. of 1 N sodium hydroxide. Stir at 5° C. for 4.5 hours, then add six liters of saturated aqueous sodium chloride solution. Extract with methylene chloride, then wash the combined extracts with water, dry over sodium sulfate, filter and evaporate the methylene chloride extract to a residue comprising 4,5-oxido-17α-ethinylestran-17β-ol-3-one (yield, 11.60 g.). Purify by crystallizing from ether or acetone-hexane.

(B) 4-azido-17α-ethinyl-4-estren-17β-ol-3-one.—Stir at room temperature for 48 hours a mixture consisting of 10 g. of 4,5-oxido-17α-ethinylestran-17β-ol-3-one, 30 g. of sodium azide, 5 ml. of water, 300 ml. of methanol and 5 ml. of acetic acid. Add the reaction mixture to 3 liters of saturated aqueous sodium chloride solution and collect by filtration the resultant precipitate comprising 4-azido-17α-ethinyl-4-estren-17β-ol-3-one (10 g.).

Purify by crystallization from ether or acetone-hexane to yield 4 - azido-17α-ethinyl-4-estren-17β-ol-3-one (M.P. 130° C., dec. [α]$_D$ +1.8° (dioxane); λ$_{max.}$ 279 mμ (ε 10,861)

λ$_{max.}^{Nujol}$ 2.84, 2.95, 3.06, 4.75, 5.98, and 6.29 mμ;

NMR ν (p.p.m.) 0.92, 2.60; mass spectrum molecular weight 339.42, —m/e 339.

EXAMPLE 2

(d, l)-4-azido-13β-ethyl-17α-ethinyl-4-gonan-17β-ol-3-one (A) (d, l)-4,5-oxido - 13β - ethyl-17α-ethinylgonan-17β-ol-3-one.—To a stirred solution of 3.12 g. of (d, l)-13β-ethyl-17α-ethinyl - 4 - gonen-17β-ol-3-one in 312 ml. of methanol maintained at 5° C. add 15 ml. of 30% hydrogen peroxide and 1 ml. of 1 N sodium hydroxide. Allow the reaction mixture to stand at 5° C. for four hours, then pour into 600 ml. of water and adjust the reaction mixture to about pH 7 with acetic acid, then add 10 g. of sodium sulfate. Evaporate the reaction mixture in vacuo to a volume of about 300 ml.; cool the resultant aqueous methanol mixture and collect by filtration the resultant precipitate comprising (d, l)-4,5-oxido-13β-ethyl - 17α-ethinylestran-17β-ol-3-one (yield 1.38 g.).

(B) (d, l)-4-azido-13β-ethyl-17α-ethinyl-4-gonen-17β-ol-3-one.—Stir at room temperature for 46 hours a mixture of 1 g. of (d, l)-4,5-oxido - 13β - ethyl-17α-ethinylestran-17β-ol-3-one, 3 g. of sodium azide, 0.5 ml. of acetic acid, 40 ml. of methanol and 10 ml. of water. Add the reaction mixture to 400 ml. of water saturated with sodium chloride; collect by filtration the resultant precipitate comprising (d, l)-4-azido-13β-ethyl - 17α - ethinyl-4-gonen-17β-ol-3-one (yield, 1.03 g.).

Purify by crystallization from isopropyl ether: M.P. 122–125° C.; [α]_D 0+0.6° (dioxane); λ_max. 280 mμ (ε 10,555);

λ_max.^Nujol 2.93, 3.06, 4.73, 5.98 and 6.26 mμ.

EXAMPLE 3

(d)-4-azido-13β-ethyl-17α-ethinyl-4-estren-3-one (A) (d)-4,5-oxido-13β-ethyl-17α-ethinylestran-17β-ol-3-one.—To a stirred mixture of 3.12 g. of (d)-13β-ethyl-17α-ethinyl-4-gonen-17β-ol-3-one, in 300 ml. of methanol at 5° C., add 15 ml. of 30% aqueous hydrogen peroxide and 1 ml. of 1 N sodium hydroxide and 31 ml. of methylene chloride. Stir for four hours at 5° C., then add acetic acid until the reaction mixture is at a pH in the range of from 6.5 to about 7; then add 600 ml. of water saturated with sodium sulfate. Evaporate the reaction mixture in vacuo to a volume of about 600 ml. Extract the aqueous mixture with methylene chloride, wash the combined chloroform extracts with dilute aqueous sodium hydroxide, then with water. Evaporate the washed methylene chloride solution to a residue comprising (d)-4,5-oxido-13β-ethyl-17α-ethinylestran-17α-ol-3-one (yield, 3.07 g.).

Purify by crystallization from ether.

(B) (d)-4-azido-13β-ethyl-17α-ethinyl-4-gonen-17β-ol-3-one.—Stir at room temperature for 48 hours the mixture of 1 g. of (d)-4,5-oxido-13β-ethyl-17α-ethinylgonan-17β-ol-3-one, 3 g. of sodium azide, 40 ml. of methanol, 10 ml. of water and 0.5 ml. of acetic acid. Add the reaction mixture to a large volume of water, collect by filtration the resultant precipitate, air dry the precipitate, then dissolve in methylene chloride. Treat the warm methylene chloride solution with decolorizing charcoal and separate the insolubles by filtration. Evaporate the filtrate to a residue comprising (d)-4-azido-13β-ethyl-17α-ethinyl-4-gonen-17β-ol-3-one (yield, 907 mg.).

Purify by thick layer silica gel chromatography, developing with chloroform/ethyl acetate and eluting with methylenechloride/acetone to obtain (d)-4-azido-13β-ethyl-17α-ethinyl-4-gonen-17β-ol-3-one (yield, 679 mg.).

Purify by crystallization from ether, M.P. 144–148° C.; [α]_D −7.7° (dioxane); λ_max. 280 mμ (ε 11,275);

λ_max.^Nujol 2.91, 3.02, 4.75, 5.96, 6.25 mμ.

EXAMPLE 4

6-azido-11β-chloro-17α-ethinyl-4-estren-17β-ol-3-one (A) 4,5 - oxido-11β-chloro-17α-ethinylestran-17β-ol-3-one.—Add 5.85 ml. of 30% hydrogen peroxide and 0.35 ml. of 1 N sodium hydroxide to a stirred mixture of 1.17 g. 11β-chloro-17α-ethinyl-4-estren-17β-ol-3-one in 117 ml. of methanol, then add 12 ml. methylene chloride. Stir the reaction mixture for three hours; then add 200 ml. of water saturated with sodium sulfate. Evaporate the reaction mixture in vacuo to a volume of about 200 ml. then add an additional 200 ml. of water. Extract the aqueous mixture with methylene chloride, wash the combined extracts with dilute aqueous sodium hydroxide then with water and evaporate the methylene chloride solution to a residue comprising 4,5-oxido-11β-chloro-17α-ethinylestran-17β-ol-3-one (yield 1.03 g.).

Purify by crystallization from acetone-hexane.

(B) 4 - azido-11β-chloro-17α-ethinyl-4-estren-17β-ol-3-one.—Stir at room temperature a mixture consisting of 1 g. of 4,5-oxido-11β-chloro-17α-ethinyl-estran-17β-ol-3-one, 3 g. of sodium azide in 40 ml. of methanol, 10 ml. of water and 0.5 ml. of acetic acid. After 42 hours, add water saturated with sodium chloride, collect by filtration the resultant precipitate, dissolve the precipitate in chloroform, filter and evaporate the chloroform solution in vacuo to a residue comprising 4-azido-11β-chloro-17α-ethinyl-4-estren-17β-ol-3-one (yield, 880 mg.).

Purify by thick layer chromatography on silica gel developed with chloroform/ethyl acetate (9:1), eluting with methylene chloride/acetone (yield, 468 mg.). Further purify by crystallization from ether to obtain 4-azido-11β-chloro-17α-ethinyl-4-estren-17β-ol-3-one; M.P. taken rapidly darkens at 105° C. and liquifies at 127° C.; taken slowly, no definite melt up to 250° C.; [α]_D +90.7 (dioxane); λ_max. 280 mμ (ε 10,700);

λ_max.^Nujol 2.86, 3.02, 4.73, 5.98, 6.17 mμ;

NMR, δ (p.p.m.) 1.18, 2.60, 4.42–4.67 [broad, with quartet at 4.50, d. (J=3 Hz.) and 4.62, d. (J=3 Hz.)].

EXAMPLE 5

Other 4-azido-17α-alkinyl-4-gonen-17β-ol-3-ones (A) In a manner similar to that described in Examples 1(A), 2(A), 3(A), and 4(A), treat each of the following 4-gonenes with 30% hydrogen peroxide in aqueous sodium hydroxide at room temperature:

17α-propinyl-4-estren-17β-ol-3-one,
17α-(2'-bromoethinyl)-4-estren-17β-ol-3-one,
17α-(2'-trifluoromethylethinyl)-4-estren-17β-ol-3-one,
11β-fluoro-17α-ethinyl-4-estren-17β-ol-3-one,
11β-fluoro-17α-(2'-trifluoromethylethinyl)-4-estren-17β-ol-3-one,
13β-ethyl-17α-propinyl-4-estren-17β-ol-3-one, and
11β-methyl-17α-ethinyl-4-estren-17β-ol-3-one.

Isolate and purify each of the resultant products in a manner similar to that described in Examples 2(A) through 4(A) to obtain respectively:

4,5-oxido-17α-propinylestran-17β-ol-3-one,
4,5-oxido-17α-(2'-bromoethinyl)-estran-17β-ol-3-one,
4,5-oxido-17α-(2'-trifluoromethylethinyl)-estran-17β-ol-3-one,
4,5-oxido-11β-fluoro-17α-ethinylestran-17β-ol-3-one,
11β-fluoro-17α-(2'-trifluoromethylethinyl)-estran-17β-ol-3-one,
4,5-oxido-13β-ethyl-17α-propinylestran-17β-ol-3-one, and
4,5-oxido-11β-methyl-17α-ethinylestran-17β-ol-3-one.

(B) In a manner similar to that described in Examples 1(B), 2(B), 3(B) and 4(B), treat each of the 4,5-oxidoestrane derivatives prepared as described in above Example 5(A) at room temperature with sodium azide in aqueous methanol to which acetic acid has been added. Isolate and purify in a manner similar to that described to obtain respectively:

4-azido-17α-propinyl-4-estren-17β-ol-3-one,
4-azido-17α-(2'-bromoethinyl)-4-estren-17β-ol-3-one,
4-azido-17α-(2'-trifluoromethylethinyl)-4-estren-17β-ol-3-one,
4-azido-11β-fluoro-17α-ethinyl-4-estren-17β-ol-3-one,
4-azido-11β-fluoro-17α-(2'-trifluoromethylethinyl)-4-estren-17β-ol-3-one,
4-azido-13β-ethyl-17α-propinyl-4-estren-17β-ol-3-one, and
4-azido-11β-methyl-17α-ethinyl-4-estren-17β-ol-3-one.

I claim:
1. A compound having the following structural formula:

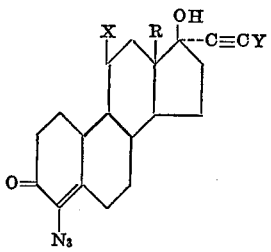

wherein R is lower alkyl, X is a member selected from the group consisting of hydrogen, lower alkyl, chlorine and fluorine, and Y is a member selected from the group consisting of hydrogen, methyl, bromine and trifluoromethyl.

2. A compound according to claim 1 wherein X and Y are hydrogen.

3. A compound according to claim 1 wherein X and Y are hydrogen and R is methyl, said compound being 4-azido-17α-ethinyl-4-estren-17β-ol-3-one.

4. A compound according to claim 1 wherein X and Y are hydrogen and R is ethyl, said compound being 4-azido-13β-ethyl-17α-ethinyl-4-gonen-17β-ol-3-one.

5. A compound according to claim 1 wherein X is chlorine, Y is hydrogen and R is methyl, said compound being 4-azido-11β-chloro-17α-ethinyl-4-estren-17β-ol-3-one.

6. The process for preparing a compound having the following structural Formula I:

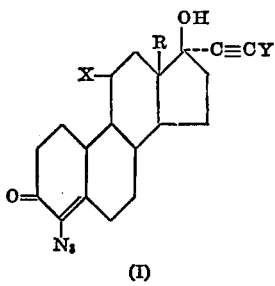

(I)

wherein R is lower alkyl, X is a member selected from the group consisting of hydrogen, lower alkyl, chlorine and fluorine, and Y is a member selected from the group consisting of hydrogen, methyl, bromine and trifluoromethyl; which comprises treating a member selected from the group consisting of a 3-keto-4,5-oxidogonane of the following structural Formula II:

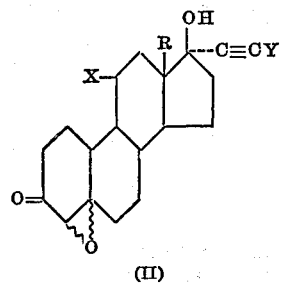

(II)

wherein R, X and Y are as defined hereinabove for Formula I, with an alkali metal azide in a non-reactive organic solvent.

7. The process according to claim 6 wherein said alkali metal azide is sodium azide.

8. The process according to claim 6 wherein said alkali metal azide is sodium azide and said 3-keto-4,5-oxidogonane of Formula II is a compound wherein X and Y are hydrogen and R is methyl whereby is obtained 4-azido-17α-ethinyl-4-estren-17β-ol-3-one.

9. The process according to claim 6 wherein said compound of Formula II is treated with sodium azide in aqueous methanol containing acetic acid.

10. The process according to claim 6 wherein said non-reactive organic solvent is slightly acidic aqueous methanol.

References Cited
UNITED STATES PATENTS
3,665,017   5/1972   Teutsch et al. _____ 260—349

HENRY A. FRENCH, Primary Examiner

U.S. Cl. X.R.
260—397.4, 397.45, 999